United States Patent [19]
Banker

[11] 3,827,174
[45] Aug. 6, 1974

[54] FISH-RELEASING FISH HOOK

[76] Inventor: Louis C. Banker, 186 First St., Britt, Iowa 50423

[22] Filed: Apr. 9, 1973

[21] Appl. No.: 349,266

[52] U.S. Cl.............................. 43/43.16, 43/53.5
[51] Int. Cl........................................... A01k 83/00
[58] Field of Search................ 43/43.16, 37, 53.5

[56] References Cited
UNITED STATES PATENTS
| | | | |
|---|---|---|---|
| 2,815,603 | 12/1957 | Bandemer | 43/43.16 |
| 2,841,914 | 7/1958 | Butler | 43/43.16 |
| 3,397,477 | 8/1968 | Hand | 43/37 X |

Primary Examiner—Robert Peshock
Assistant Examiner—Daniel J. Leach
Attorney, Agent, or Firm—Hiram A. Sturges

[57] ABSTRACT

A fish-releasing fish hook assembly comprising a fishing line, a hook shank having an eye at one end to which the line is attached, and an arcuate member pivotally secured to a curved portion at the other end of the shank. The pivoted member has a point at one end of one of its sides and a holding portion on the other of its sides. A spring-biased sleeve is mounted on the shank to engage the holding portion and movement of the sleeve by separate line means releases the pivoted member so that it can tip into a position for releasing a fish after it has been caught.

6 Claims, 3 Drawing Figures

FISH-RELEASING FISH HOOK

FIELD OF THE INVENTION

This invention is in the field of fish hooks of a type designed for releasing the fish after it has been caught.

DESCRIPTION OF THE PRIOR ART

FIsh hooks in this field are illustrated, for example, by my own earlier U.S. Pat. No. 2,984,041, titled: FISH HOOK, issued to Louis C. Banker on May 16, 1961.

The fish hook of the said patent needed further perfecting for a well-balanced operation, both during the catching of a fish and during the removal of the fish from the hook.

It is particularly important to be able to eliminate tiny and costly interfitting parts from the fish hook of the patent in order to perfect a fish hook that can be manufactured and sold at a reasonable cost.

This invention is to be particularly distinguished from prior art concepts of fish-releasing fish hooks in which that line which is normally taut during trolling or during the reeling in after casting is the one which holds the tilting barbed section of the fish hook in "catching" position. Such a concept will allow the barbed end section to tilt out of catching position and toward a release position with respect to the shank whenever the main line is not taut, such as when a fish swims toward the pole. When this condition occurs, it is possible that a sidewise motion of the head end of a fish with respect to the direction of the fish pole can, at times, permit the hook to come loose. This is because the water resistance against the line itself, resisting sidewise movement of the line with respect to itself, can, at such times, give a tug on the hook toward a side of the fish's head.

This invention is also to be distinguished from concepts in which it is not intended that a hook move toward a release position and in which mechanisms on the hook would structurally prevent such movement into release position. Such structures have been proposed for the different purpose of using a pivoting barbed section which sets itself into a fish as a result of spring tension in the hook, somewhat like a spring is used in a bear trap.

SUMMARY OF THE INVENTION

A fish hook is disclosed having an arcuate pointed portion attached thereto. The pointed portion is pivotally secured to a main body portion of the fish hook and a sleeve normally holds the pointed portion in a normal fish hook position with respect to the shank of the main bodh portion. Movement of the sleeve releases the pointed portion so that it can tip into a position for releasing a fish after it has been caught.

The sleeve is urged into a position for holding the pointed member in place by means of a compression spring cooperating with the shank, a construction which has been found to operate with perfection during the catching of the fish, the tension of the spring being easily overcomable by a pressure moving the sleeve against the spring which can be accomplished by a sleeve-pulling line means which can be operated from a position remote from the fish's mouth.

A tube is used to slidably contain the sleeve-pulling line means and a leader attached to the shank, a loop on the sleeve-pulling line means extending outwardly through a side of the tube rather than the end whereby it is quickly distinguishable from a loop on the leader so that the fisherman can attach his fishline to the proper loop quickly.

DESCRIPTION OF THE PREFERRED EMBODIMENT

Figure 1:
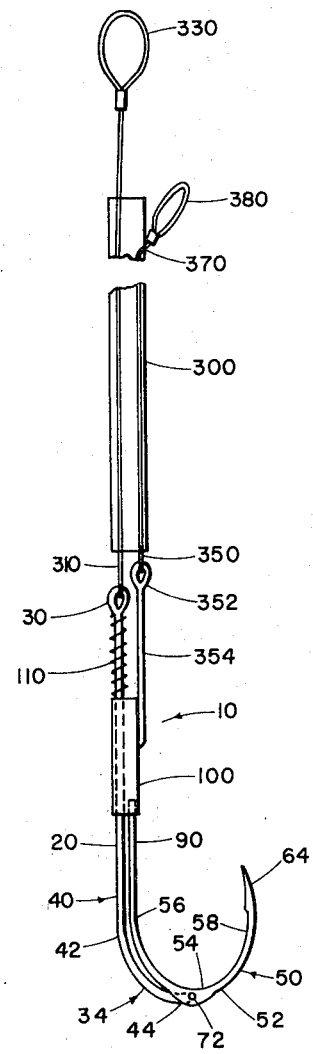
FIG. 1 is a side elevation of the fish-releasing fish hook of this assembly shown in the fish-catching position with a leader line and a control line visible through a transparent tube.

Referring to FIG. 1, the fish-releasing hook assembly of this invention has as one of its parts an elongated line means 310, later described, and has as the other of its parts a special fish-releasing fish hook of this invention generally indicated at 10 comprising an elongated shank 20 of stiff wire having a line means attaching means 30 at one end thereof which can be simply a conventional eye.

The shank 20 has an arcuate supporting section 34 on its other end, or in other words, that end thereof which faces away from the attaching means 30 and forming approximately half of a "C" shape configuration.

The supporting section 34 and the shank 20 together form a main body portion generally indicated at 40. One side of the supporting section 34 is seen at 42 and it is attached to the lower end of the shank 20. The other end of the supporting section 34 is a terminal end, as seen at 44.

An arcuate pointed member 50 is provided having a lower portion 52 of approximately a "C" shape, which latter has a central section 54 disposed farthest from that one end of the shank 20 which has on it the attaching means or eye 30, the central section 54 having sides 56 and 58 extending away from the central section 54 in upward directions generally toward the attaching means 30.

The pointed member 50 has a point 64 at the terminal end of one of its sides 58.

The central portion 54 of the arcuate member 50 is pivotally attached to the terminal end 44 of the supporting section 34 by means of a rivet 72, which latter extends horizontally transversely of the shank 20 which is straight and transversely also of the endmost part of the holding portion 34 near the rivet 72.

Because of this construction, the point 64 can move away from the end of the shank 20 where the attaching means 30 is.

The pointed member 50 has an upper holding portion 90 opposite its point 64. The holding portion 90 is disposed alongside the straight shank 20 in parallelism therewith and in close proximity thereto.

A vertically elongated sleeve 100 is disposed around the shank 20 and around the holding portion 90 when the device is in a position for catching fish, as shown in FIG. 1.

A compression spring 110 on the shank 20 and cooperatively correlated with the shank 20 normally urges the sleeve 100 downwardly and into a position for receiving that end of the holding portion 90 which is closest to the shank 20 and closest to the attaching means 30.

The spring 110 can be compressed thereby permitting the sleeve 100 to be moved enough toward the attaching means 30 as to release the holding portion 90 of the pointed member 50. When the pointed member 50 is released, it can pivot into a position so that its pointed end 64 assumes a position pointing away from the attaching means or eye 30, whereby a fish can simply fall off.

Figure 3:
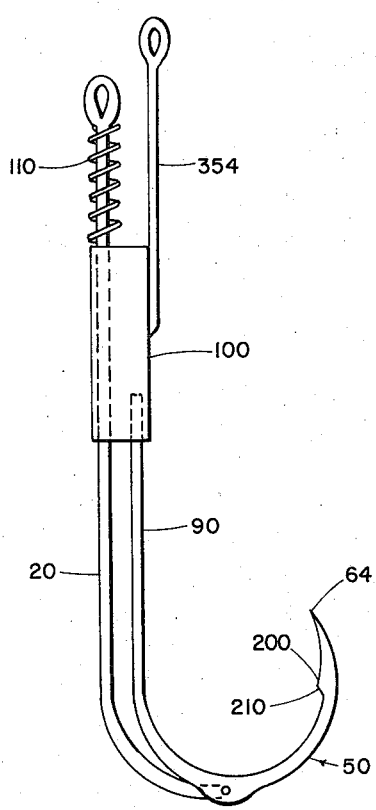
FIG. 3 is an enlarged detail of the lower portion of the fish hook shown in fish-catching position.

It is to be understood that the hook pointed member 50 does not have a barb in the usual sense, in other words, it has a shoulder 200, best seen in FIG. 3, but the shoulder 200 has a side thereof facing away from the point 64 which, preferably, slants slightly outwardly toward the shank 20 away from the adjacent part of the remainder of the pointed member or pointed portion 50 so that the backside surface 210 of the shoulder 200 is slanted for allowing a fish to slip off, rather than slanted in a manner for preventing a fish from slipping off, as is the usual case with a barbed hook.

In another sense, it is important that the surface 210 on the backside of the shoulder 200, or in other words, on that side of the shoulder 200 which faces away from the point 64, be not inclined in a direction away from the point 64 as its portions nearest the shank are approached so that a fish can slip off.

This is not such a disadvantage as it would seem during regular fishing. Barbs have had their place in the past, but to a greater extent, they are becoming less popular. It is customary now to maintain a tight line on a fish, whereby a barb is not as needed as formerly.

A flexible plastic tube is seen at 300. A shank holding leader or shank holding line means is shown at 310 and is suitably secured to the attaching means or eye 30 and extends upwardly completely through, or at least through a portion of the tube 300, terminating at its upper end in a loop 330.

A sleeve-pulling line means is shown at 350 with its lower end attached to an eye 352 of an elongated connector 354 having its lower end fixed to the sleeve 100 in a suitable manner.

The sleeve-pulling line means 350 extends upwardly through the tube 300 and comes out an opening 370 in a side of the tube 300 and terminates there in a loop 380.

It is important to observe that the fish-releasing hook assembly is a basic term comprising both the line means 310 and the hook 10 in which the lines means 310 is permanently attached to the shank 20 of the hook in the sense that the eye 30, which latter can be called a line means attaching means 30, forms a part of the shank 20, whereby the line means 310 is firmly connected to the shank 20 at the attaching means or eye 30.

Figure 2:
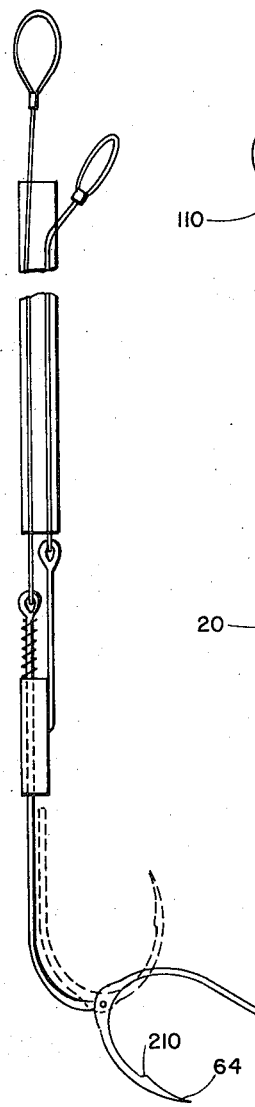
FIG. 2 is a view similar to FIG. 1, but showing the fish hook parts in a releasing position with the pointed member shown in full lines in a releasing position and in dotted lines in the position it assumes immediately before rotating.

In operation, it will be seen that the pointed end 64 (when the sleeve 100 has reached the release position of FIG. 2) is free to assume a "certain position" for releasing a fish, this "certain position" being one in which the pointed end is pointing away from the pivotal attaching means or rivet 72 in a direction (substantially as shown in FIG. 2) opposite from the direction the line means 310 is from the pivotal attaching means or rivet 72.

Further it is important to realize that the hook assembly of this invention is free of any means (except the sleeve 100) preventing the pointed end 64 from reaching the "certain position" of release above described and generally shown in FIG. 2.

I claim:

1. A fish-releasing hook assembly comprising a line means and a hook, said hook comprising an elongated shank having a line means attaching means on one end, said line means being firmly connected to said shank at said attaching means, said shank having an arcuate supporting section on its other end forming approximately half of a C-shape configuration, said supporting section having one end attached to said shank and its other end having a terminal end, an arcuate pointed member having a portion of approximately a C-shape which latter has a central section disposed farthest from said one end of said shank and having sides extending away from said central section, said pointed member having a point at one end of one of its sides, means pivotally attaching said pointed member central portion to said terminal end of said supporting section in a manner permitting the said pointed end of said pointed member to move away from said attaching means end of said shank, said pointed member having an upper holding portion opposite said point, said holding portion being disposed alongside said shank, a sleeve means disposed around said shank and around said holding portion, a spring on said shank and cooperatively correlated with said shank to normally urge said sleeve into a position receiving that end of said holding portion which is closest to said shank attaching means and permitting said sleeve means to be moved enough toward said line means attaching means to release said holding portion so that said pointed member can rotate about said axis so as to permit said pointed end to assume a certain position pointing away from said pivotal attaching means in a direction generally opposite from the direction said line means attaching means is from said pivotal attaching means, said hook assembly being free of any means except said sleeve means preventing said pointed end from reaching said certain position.

2. The fish-releasing hook assembly of claim 1 further having a tube, a shank-holding line means extending through at least a portion of said tube and having a lower end attached to said shank attaching means, a sleeve-pulling line means extending through at least a portion of said tube, and means attaching said sleeve-pulling line means to said sleeve.

3. The fish-releasing hook of claim 2 in which the sleeve-pulling line means extends outwardly through a hole in the side of said tube where it can be easily seen so as to be distinguishable from the shank holding line means.

4. The fish-releasing hook assembly of claim 1 in which said means pivotally attaching said pointed member central portion to said supporting section comprises a rivet.

5. The fish-releasing hook assembly of claim 1 in which said pointed member has a protrusion inwardly from its pointed terminal end, said protrusion having a shoulder on its end facing away from said point, said shoulder inclinding away from said point toward the pointed member side adjacent to said shoulder more so than extending at a right angle to the adjacent portion of said arcuate pointed member so that when said arcuate pointed member is released a fish can fall off of said shoulder with ease as compared with the effect of the conventional barb.

6. The fish-releasing hook assembly of claim 1 in which said pointed member has a protrusion inwardly from its pointed terminal end, said protrusion having a shoulder on its end facing away from said point, said shoulder having a surface means on its side facing away from said point which is inclined in a direction for enabling a fish to slip off of said shoulder to drop from said hook, said surface means being disposed closer to a center of the adjacent portion of said pointed member at that end thereof which is farthest from said point.

* * * * *